(12) United States Patent
Lefner et al.

(10) Patent No.: US 7,835,983 B2
(45) Date of Patent: Nov. 16, 2010

(54) CREDIT APPROVAL MONITORING SYSTEM AND METHOD

(75) Inventors: Kent Lefner, Dyer, IN (US); Susan Zabran, Villa Park, IL (US)

(73) Assignee: Trans Union LLC, Chicago, IL (US)

( * ) Notice: Subject to any disclaimer, the term of this patent is extended or adjusted under 35 U.S.C. 154(b) by 1619 days.

(21) Appl. No.: 10/944,606

(22) Filed: Sep. 17, 2004

(65) Prior Publication Data

US 2005/0065874 A1 Mar. 24, 2005

Related U.S. Application Data

(60) Provisional application No. 60/504,242, filed on Sep. 18, 2003.

(51) Int. Cl.
*G06G 7/00* (2006.01)

(52) U.S. Cl. .......................... 705/38; 705/35

(58) Field of Classification Search ............... 705/35–45
See application file for complete search history.

(56) References Cited

U.S. PATENT DOCUMENTS

| | | | |
|---|---|---|---|
| 6,988,085 B2 * | 1/2006 | Hedy | 705/51 |
| 7,028,052 B2 * | 4/2006 | Chapman et al. | 707/104.1 |
| 2002/0072975 A1 * | 6/2002 | Steele et al. | 705/14 |
| 2002/0167949 A1 | 11/2002 | Chapman et al. | |
| 2003/0074297 A1 * | 4/2003 | Carragher | 705/36 |

FOREIGN PATENT DOCUMENTS

| | | | |
|---|---|---|---|
| WO | WO 00/46769 | * | 8/2000 |
| WO | WO 01/45012 | * | 6/2001 |
| WO | WO 02/091127 A2 | | 11/2002 |
| WO | WO 02/091127 A3 | | 11/2002 |

* cited by examiner

*Primary Examiner*—Kambiz Abdi
*Assistant Examiner*—Sarah M Monfeldt
(74) *Attorney, Agent, or Firm*—Wood, Phillips, Katz, Clark & Mortimer

(57) ABSTRACT

A credit approval monitoring system comprises a database system storing credit files for consumers. A monitoring processing system monitors credit reports of subscribing consumers and transmits messages indicative of changes in a subscribers credit report. A screening processing system screens credit reports to determine if credit applicants satisfy select criteria. A watch processing system is operatively associated with the monitoring processing system and the screening processing system for periodically requesting the screening processing system to determine if the credit report of a select consumer satisfies the select criteria and sending the determination to the monitoring processing system to notify the select consumer if the screening processing system determines that the credit report of the select consumer satisfies the select criteria.

11 Claims, 5 Drawing Sheets

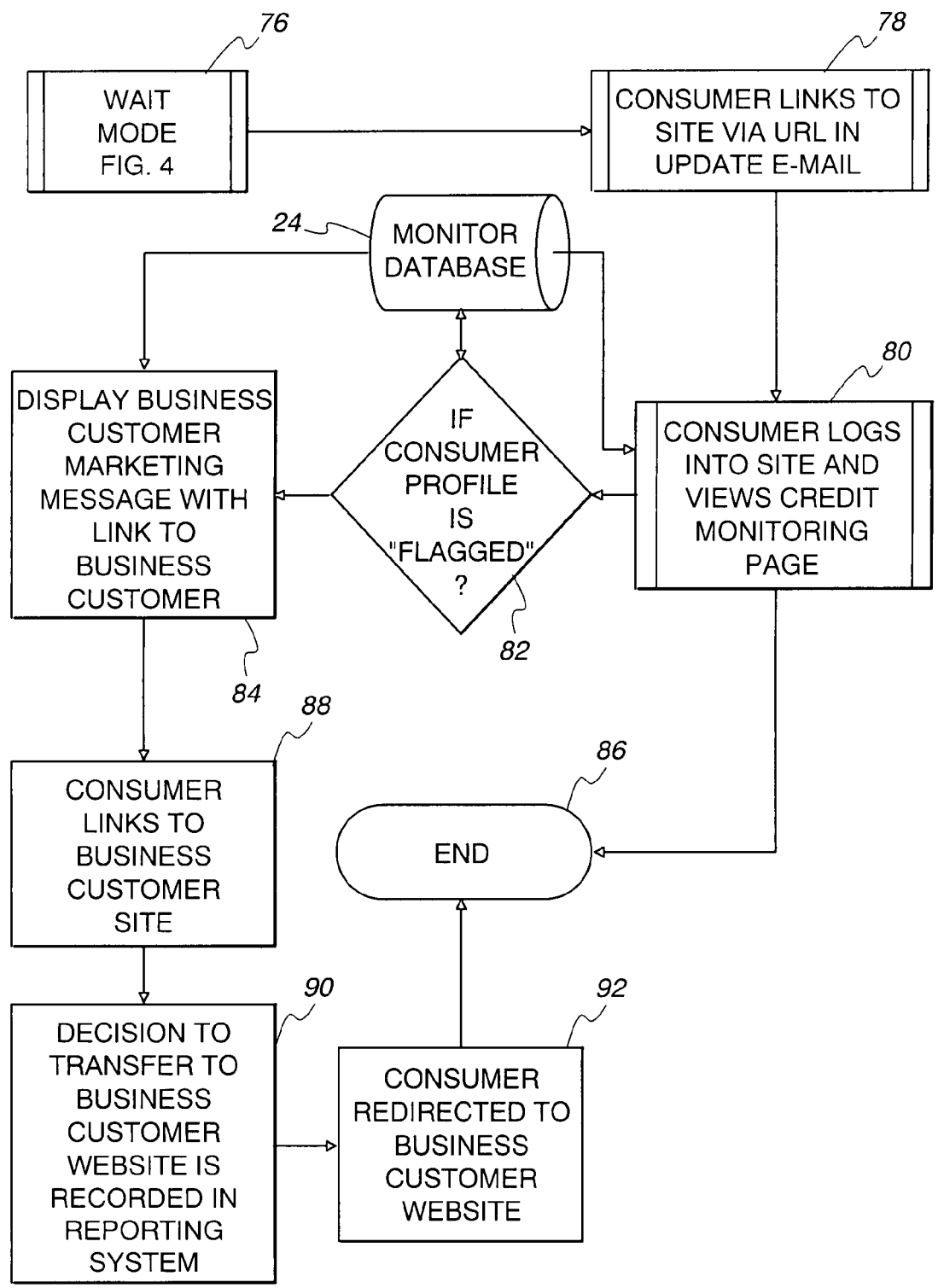

CREDIT APPROVAL MONITORING SYSTEM AND METHOD

CROSS REFERENCE

This application claims priority of application No. 60/504,242 filed Sep. 18, 2003.

FIELD OF THE INVENTION

This invention relates to credit monitoring and screening and, more particularly, to a credit approval monitoring system and method.

BACKGROUND OF THE INVENTION

Simply stated, credit is borrowed money. Credit signifies the amount of trust a creditor has in the fact that a debtor will repay borrowed funds pursuant to an agreement. The amount of trust a creditor has directly translates into the amount of money that will be provided to the customer and which must be repaid.

To facilitate credit transactions, a credit bureau acts as a clearinghouse for credit history information. Credit grantors provide credit bureaus with factual information on how their credit customers pay their bills. Credit grantors can obtain credit reports about consumers who wish to open accounts with them.

Recently, credit bureaus have provided services to consumers allowing the consumer to monitor changes to their personal credit information. These monitoring systems can provide notices any time a change is made to the consumer's credit report to ensure that the credit information used by the credit bureau is accurate and up to date. Moreover, the information can be used by the consumer to ascertain the likelihood of obtaining credit. However, the consumer will not know if the changes are sufficient to allow them to obtain credit without actually applying for the same.

Only businesses or individuals with a permissible purpose can access a consumer's credit report. An example of a permissible purpose includes accessing a credit report in connection with a credit transaction involving the consumer. Because of these restrictions, a credit grantor cannot on its own access credit information to determine the credit worthiness of any particular consumer.

The present invention is directed to enhancements in current systems and method for managing relationships between credit grantors and consumers.

SUMMARY OF THE INVENTION

In accordance with the invention there is provided a credit approval monitoring system and method.

There is disclosed in accordance with one aspect of the invention, a credit approval monitoring method comprising: continually monitoring a credit report of a consumer; notifying the consumer when any changes are made to the consumer's credit report; periodically screening the credit report to determine if the consumer satisfies select criteria of a credit grantor; and notifying the consumer if the screening determines that the consumer satisfies the select criteria.

It is a feature of the invention that periodically screening the credit report to determine if the consumer satisfies select criteria of a credit grantor comprises screening the consumer after the consumer has been denied credit.

It is another feature of the invention that periodically screening the credit report to determine if the consumer satisfies select criteria of a credit grantor comprises making a daily determination that the consumer satisfies the select criteria.

It is still a further feature of the invention that notifying the consumer if the screening determines that the consumer satisfies the select criteria comprises transmitting an email message to the consumer including a link to a network site providing a marketing message to the consumer.

It is still another feature of the invention that the consumer is directed to a network site of the credit grantor if the consumer responds to the marketing message. It is yet another feature of the invention that periodically screening the credit report to determine if the consumer satisfies select criteria of a credit grantor comprises determining a credit score for the consumer and comparing the credit score to the select criteria.

There is disclosed in accordance with another aspect of the invention a credit approval monitoring method comprising: providing a notification of adverse action to a credit applicant responsive to the credit applicant not satisfying select criteria; subsequent to the adverse action notification monitoring a credit report of the credit applicant; periodically screening the credit report to determine if the credit applicant satisfies the select criteria; and notifying the credit applicant if the screening determines that the credit report satisfies the select criteria.

There is disclosed in accordance with yet another aspect of the invention a credit approval monitoring system. The system comprises a database system storing credit files for consumers. A monitoring processing system monitors credit reports of subscribing consumers and transmits messages indicative of changes in a subscribers credit report. A screening processing system screens credit reports to determine if credit applicants satisfy select criteria. A watch processing system is operatively associated with the monitoring processing system and the screening processing system for periodically requesting the screening processing system to determine if the credit report of a select consumer satisfies the select criteria and sending the determination to the monitoring processing system to notify the select consumer if the screening processing system determines that the credit report of the select consumer satisfies the select criteria.

Further features and advantages of the invention will be apparent from the specification and the drawings.

BRIEF DESCRIPTION OF THE DRAWINGS

FIG. 5 is a flow diagram illustrating an e-mail routine of the credit approval monitoring method in accordance with the invention.

DETAILED DESCRIPTION OF THE INVENTION

In accordance with the invention, a credit approval monitoring system and method provides a gateway for businesses to market credit related products to consumers by using combined information, architecture and technology of credit monitoring products and decisioning or screening products that analyze a consumer's credit file using credit attributes and the like.

Conventional credit monitoring products facilitate consumer analysis of changes to their personal credit information. Likewise, current decisioning products provide a pre-screen tool that facilitates the cross sell of credit products and services. The credit approval monitoring system and method in accordance with the invention combines and enhances these two products for businesses to use in managing consumer relationships. The system and method provides a new product relationship with a consumer by matching consumers who participate in a credit monitoring service with offers from businesses when changes in the consumer's credit profile meets criteria pre-defined by the business. Particularly, the credit approval monitoring system and method supports promoting credit monitoring services to businesses for consumer usage. The system and method develops the e-commerce capabilities targeting directly to consumers and to manage and grow consumer relationships while allowing promotion of credit monitoring to businesses.

As a consumer's credit profile changes, credit monitoring services continue to inform the consumer. In accordance with the invention decisioning or screening services evaluate opportunities to present the consumer with marketing offers from the business responsible for the use of the credit monitoring service. These marketing offers are packaged and displayed when the consumer returns to the credit monitoring service to check status.

Figure 1:
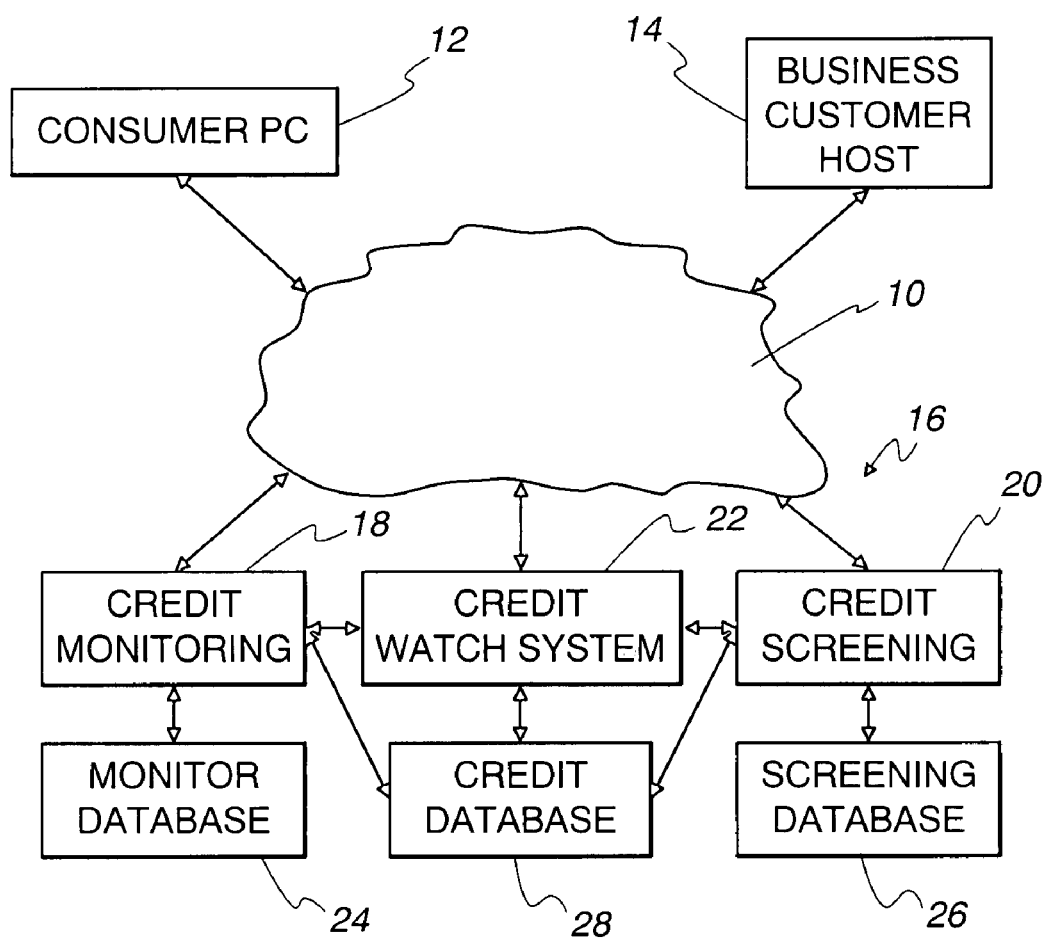
FIG. 1 is a block diagram of a credit approval monitoring system in accordance with the invention.

Referring to FIG. 1, a block diagram illustrates an exemplary system for implementing the credit approval monitoring system and method. A cloud 10 represents a communication network for providing electronic communications. The network 10 may comprise any available network such as a telephone network, the internet, or any other means of providing electronic communications. Connected to the network 10 are a consumer PC 12, a business customer host 14 and a credit approval monitoring system 16. The credit approval monitoring system 16 comprises a credit monitoring system 18, a credit screening system 20 and a credit watch system 22, each connected to the network 10. Also, the credit watch system is operatively connected to the credit monitoring system 18 and the credit screening system 20. Particularly, the credit monitoring system 18 is also a stand alone product, as described above, which facilitates consumer analysis of changes to personal credit information and uses a monitor database 24. The credit screening system 20 also operates as a stand alone product, as a pre-screen tool that facilitate the sale of credit products and services. This credit screening system 20 uses a screening database 26. The credit watch system 22 functions with the credit monitoring system 18 and the credit screening system 20, as discussed above, and uses a general credit database 28 that stores credit history information for consumers, as discussed above.

As is apparent, FIG. 1 is illustrative of an environment in which the credit approval monitoring system 16 can be implemented. However, the invention is not intended to be limited to any particular hardware implementation. Each block may represent a computer processing system or systems or a network of computer processing systems, servers, or the like, as necessary to implement the invention. The blocks are intended to represent functionality implemented using one or more conventional processing systems, as will be apparent to those skilled in the art.

FIGS. 2-5 comprise flow diagrams illustrating routines for a credit approval monitoring method in accordance with the invention implemented using the exemplary credit approval monitoring system 16 of FIG. 1. The process is described with reference to the exemplary system of FIG. 1. However, as is apparent, the particular process steps could be implemented in different functional blocks from those described herein.

Figure 2:
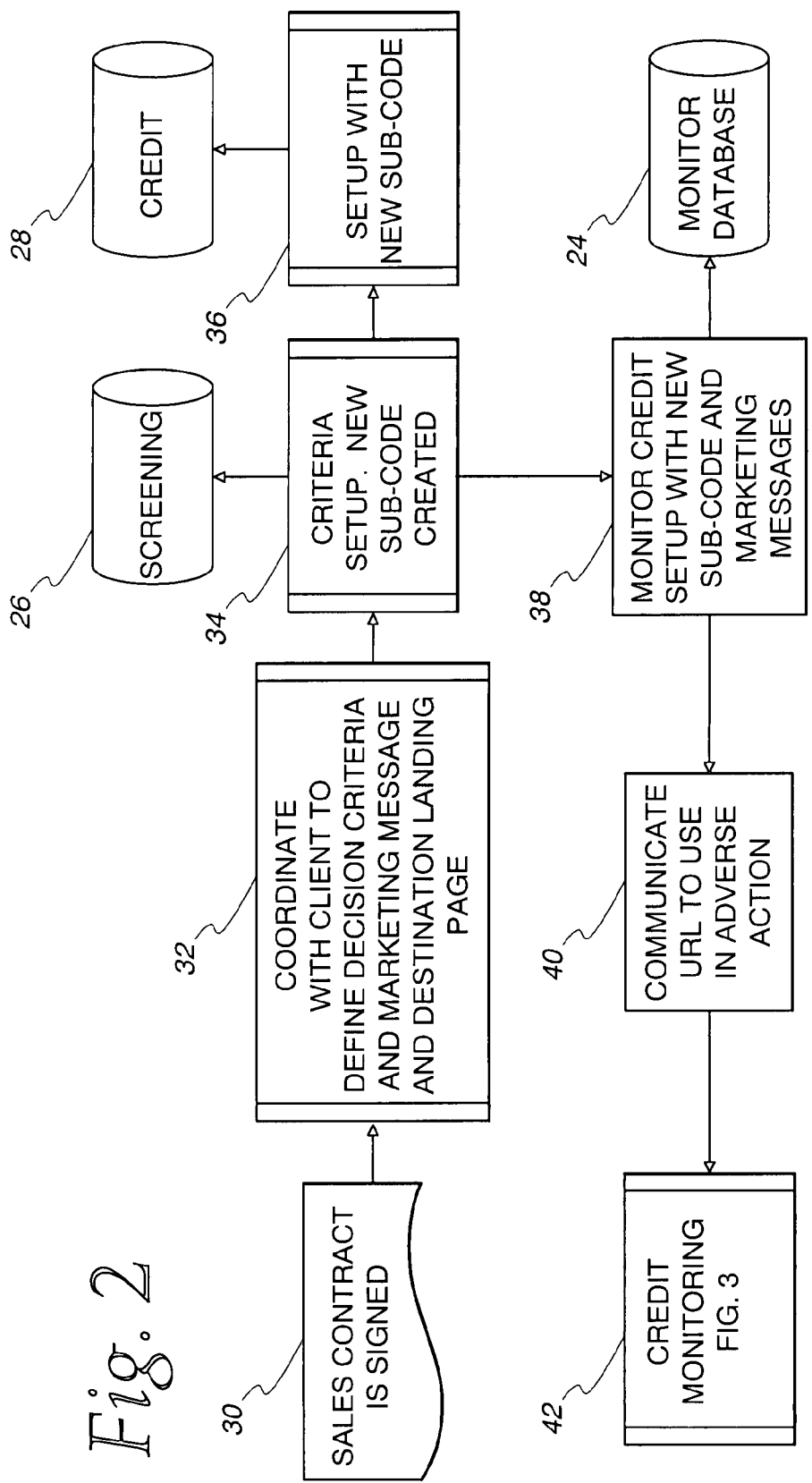
FIG. 2 is a flow diagram illustrating a sale cycle and set up routine of a credit approval monitoring method in accordance with the invention implemented using the system of FIG. 1.

Referring initially to FIG. 2, the process begins when a business customer enters into a contract with a credit bureau at a block 30 to purchase the credit approval monitoring service. At a block 32, the credit bureau and the business customer determine the particular methodology to be used for that business customer. This methodology may include the decisioning criteria used for determining credit worthiness. Additionally, the methodology includes the content of credit offers in the form of marketing messages that will be shown to consumers when an approval change is identified and a destination landing page URL to be sent to consumers when they respond to the business customer's marketing message. The URL is hosted by the business customer, for example in the host 14, see FIG. 1.

At a block 34, the business approved criteria is set up and stored in the screening database 26. The credit monitoring system 18 uses static sub-codes for data pulls. A new sub-code is created to identify the credit monitoring system 18 and the particular rules for the business customer. The credit database 28 is set up with the new sub-code at a block 36. This allows the credit monitoring system 18, see FIG. 1, to pull data from the credit database 28 using this special sub-code. The credit monitoring system 18 adds the new sub-code to a newly created sub-code table at a block 38. The new sub-code is used by the credit monitoring system 18 on behalf of a specific business customer whenever data is pulled. The marketing message content is also loaded into the monitor database 24 for later retrieval. The credit monitoring system 18 communicates to the business customer at a block 40 the URL used in adverse action notices to consumers. This URL allows the credit monitoring system 18 to identify which business customer, and thus which sub-codes, to reference for decisioning purposes. The set up process concludes at a block 42 when the business customer is prepared to begin mailing adverse action notices and the methodology proceeds to a credit monitoring routine flow diagram of FIG. 3.

Figure 3:
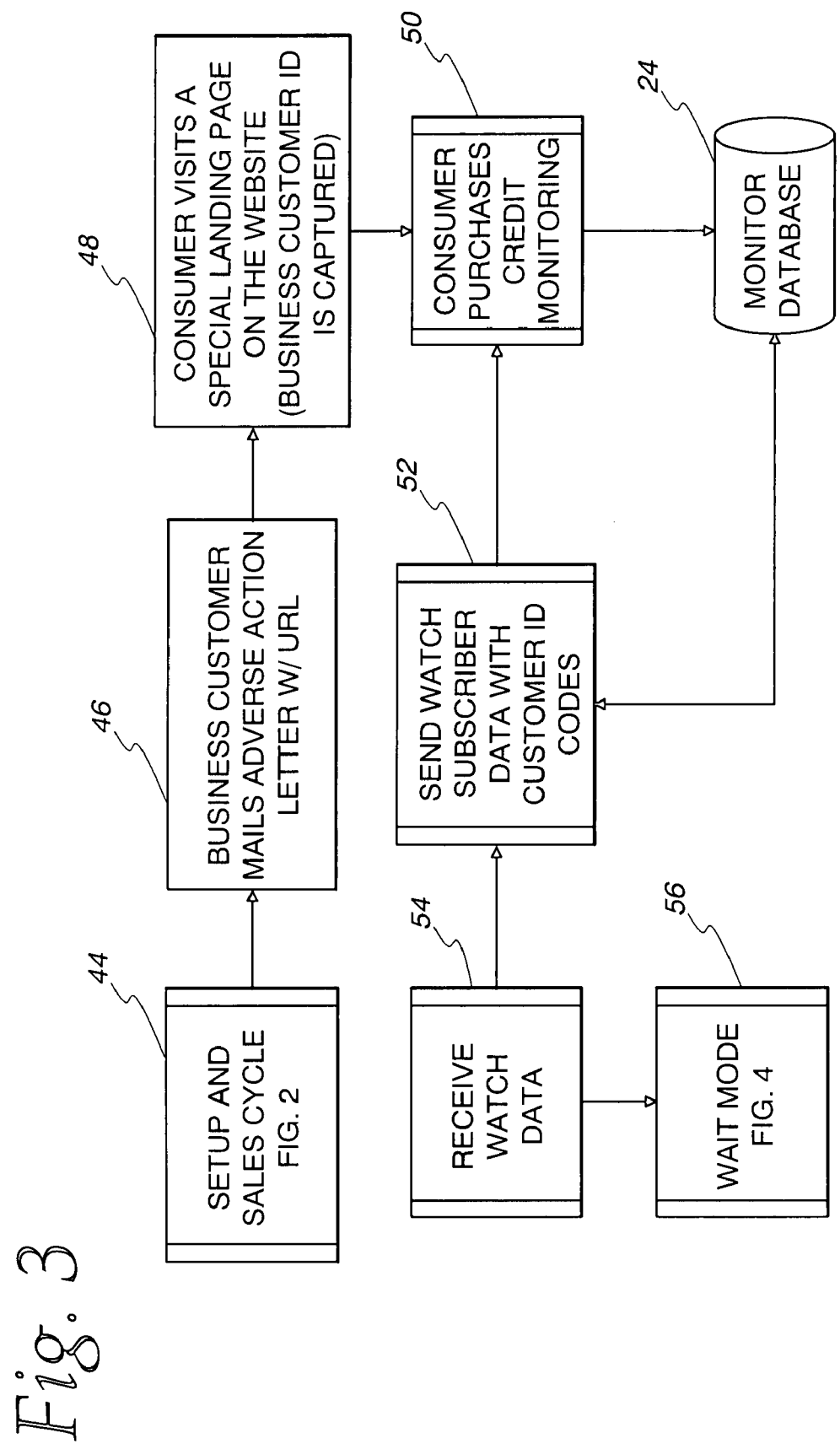
FIG. 3 is a flow diagram illustrating a credit monitoring routine for the credit approval monitoring method in accordance with the invention.

Referring to FIG. 3, the credit monitoring routine is illustrated beginning at a block 44 entered from the flow diagram of FIG. 2. The process begins at a block 46 when the business customer communicates adverse action information to consumers in the form of credit applicants. Advantageously, only applicants who are defined as "gray-area declination" consumers, will receive a letter with the credit monitoring URL messaging. These are applicants the business customer deems close enough that a future positive migration in credit may be enough to receive an approval based on the decisioning criteria set up in the credit monitoring system 18. At a block 48, the consumer, using a computer, such as the consumer PC 12, see FIG. 1, responds to the messaging and visits the landing page defined by the URL in the adverse action notice. The business customer ID is captured and the credit monitoring system 18 begins to track the business customer ID. If the consumer elects not to subscribe to any credit monitoring services on the website, then the entire process ends. If the consumer purchases credit monitoring, at a block 50, then they fill out appropriate order information and a set up process as defined by the credit monitoring system 18 and this information is stored in the monitor database 24. Once the service is successfully ordered, then the credit monitoring system 18 sends watch data to the watch system 22 using a dynamic sub-code for each entry.

Particularly, the consumer information and the business customer specific sub-code, discussed above, are transmitted on a normal schedule at a block 52. The watch system 22 receives the watch data at a block 54 for processing. The credit monitoring routine then ends when the watch service is successfully set up and the process proceeds via a block 56 to a wait routine illustrated in FIG. 4.

Figure 4:
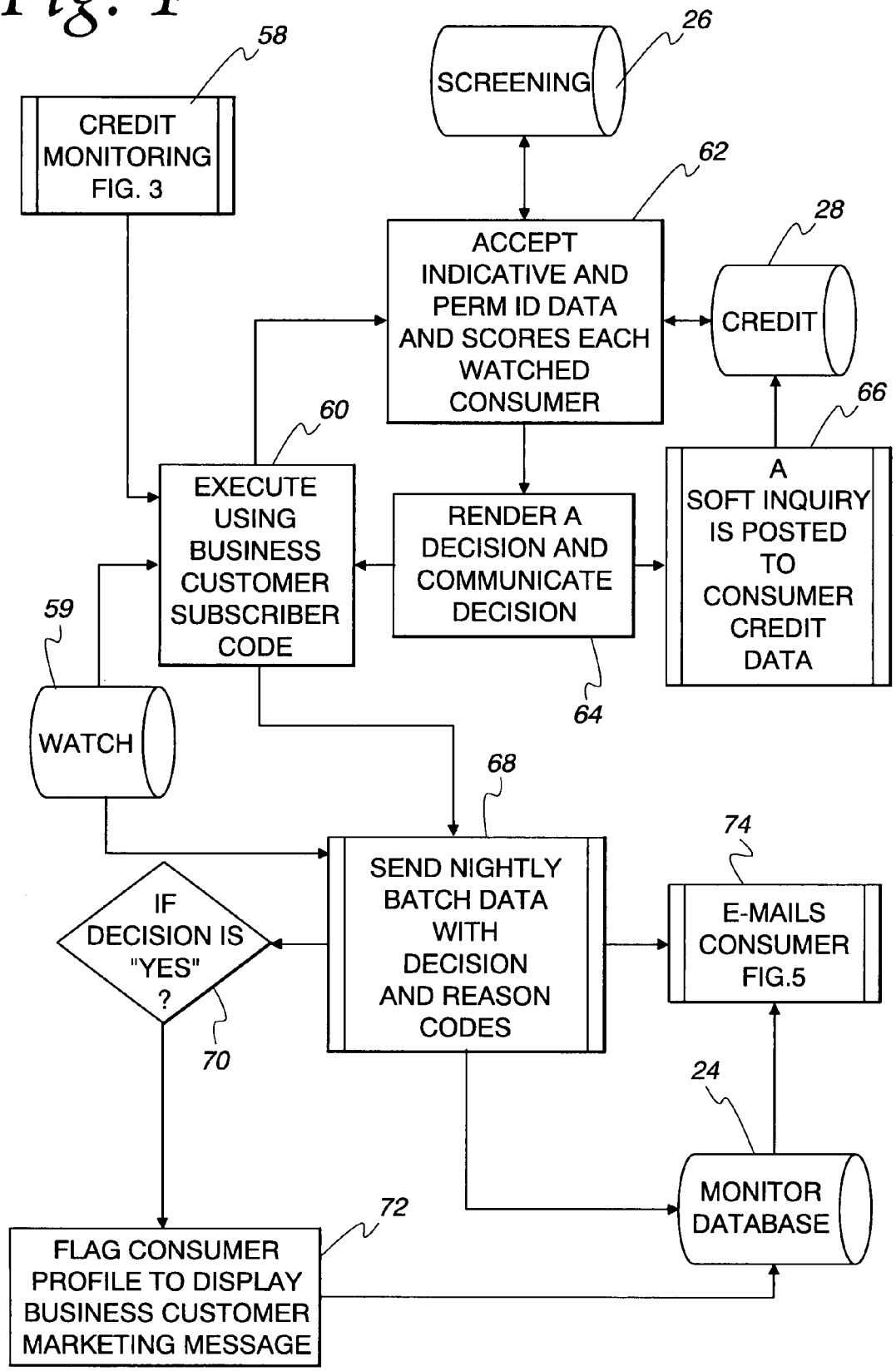
FIG. 4 is a flow diagram illustrating a wait routine of the credit approval monitoring method in accordance with the invention.

Referring to FIG. 4, the wait routine is illustrated beginning at a block 58 defining an entry point from the credit monitoring routine of FIG. 3. The wait routine begins when the watch system 22 processes information based on criteria established for a given business customer sub-code. A watch database 59, as described herein, watches a consumers credit file and takes other actions when certain conditions occur. The actions include notifying the consumer, as is conventional, and/or notifying the business customer. At a block 60, the watch system 22 executes periodically, for example nightly, using the business customer subscriber sub-code and sends to the screening system 20 screening indicative and permanent ID data and score data for each consumer being monitored. This information is accepted by the screening system 20 at a block 62 which sends a request to and receives credit information from the credit database 28. Using criteria in the screening database 26, the screening system 20 renders a credit decision at a block 64 and communicates the decision back to the block 60. Also, from a block 66 a soft inquiry is posted to the consumer credit profile in the credit database 28.

The credit monitoring system 18 periodically receives results from the watch system 22 and the screening system 20, from the blocks 59 and 60, at a block 68. The results include a reasons code for decisions. For each credit monitoring customer for which the credit monitoring system 18 receives a yes decision from the credit screening, as determined at a decision block 70, the consumer profile will be flagged at a block 72 to display the business consumer marketing message which is sent to the monitor database 24. The process ends when the credit approval monitoring system e-mails to consumers at a block 74 with change or no change notifications using the existing credit monitoring system 18.

Referring to FIG. 5, a flow diagram illustrates the e-mail routine implemented after the wait routine of FIG. 4 at a block 76. The routine begins when the consumer responds to a received change notification e-mail and visits the designated credit monitoring URL website at a block 78. At the website, the consumer logs in at a block 80 and views the standard credit monitoring page, using information from the monitor database 24. If the customer profile has been flagged, as discussed above, and as determined at a decision block 82, then the credit monitoring system 18 displays the business customer marketing message at a block 84 with links to the business customer. If the business customer profile was not flagged, then the routine ends at a node 86. If the consumer who is shown the marketing message at the block 84 elects to click on the indicated link, then the consumer will be redirected to the previously identified business customer URL site at a block 88. The consumer decision to transfer to the business customer website is recorded in a reporting system at a block 90 and the consumer is then redirected to the business customer website at a block 92. The routine then ends at the block 86 when the consumer leaves the credit monitoring system website.

Thus, in accordance with the invention, the integrated credit approval monitoring system 16 allows business customers to convert previously declined consumers. Consumers can view and respond to pre-approval messages when a change threshold is realized. Also, the potential consumer is more inclined to review the marketing position given the relationship between their personal information change and the relevance of the message. Additionally, the system 16 allows grey-area declination consumers to improve their financial condition. Consumers will be able to order credit related products easily through established business client relationships. This adds value to the proposition of resale of monitoring products to consumers by business clients. Finally, the credit approval monitoring system and method leverages existing products in an integrated credit approval monitoring system and method.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

We claim:

1. A credit approval monitoring method implemented in a computer processing system comprising:
   continually monitoring a credit report of a consumer;
   notifying the consumer when any changes are made to the consumer's credit report;
   the computer processing system periodically screening the credit report to determine if the consumer satisfies select criteria of a credit grantor; and
   notifying the consumer if the screening determines that the consumer satisfies the select criteria.

2. The credit approval monitoring method of claim 1 wherein the periodically screening the credit report to determine if the consumer satisfies select criteria of a credit grantor comprises screening the consumer after the consumer has been denied credit.

3. The credit approval monitoring method of claim 1 wherein the periodically screening the credit report to determine if the consumer satisfies select criteria of a credit grantor comprises making a daily determination that the consumer satisfies the select criteria.

4. The credit approval monitoring method comprising:
   continually monitoring a credit report of a consumer;
   notifying the consumer when any changes are made to the consumer's credit report;
   periodically screening the credit report to determine if the consumer satisfies select criteria of a credit grantor; and
   notifying the consumer if the screening determines that the consumer satisfies the select criteria wherein notifying the consumer if the screening determines that the consumer satisfies the select criteria comprises transmitting an email message to the consumer including a link to a network site providing a marketing message to the consumer.

5. The credit approval monitoring method of claim 4 further comprising directing the consumer to a network site of the credit grantor if the consumer responds to the marketing message.

6. The credit approval monitoring method of claim 1 wherein periodically screening the credit report to determine if the consumer satisfies select criteria of a credit grantor comprises determining a credit score for the consumer and comparing the credit score to select criteria.

7. A credit approval monitoring method implemented in a computer processing system comprising:
provided a notification of adverse action to a credit applicant responsive to the credit applicant not satisfying select criteria;
subsequent to the adverse action notification monitoring a credit report of the credit applicant;
the computer processing system periodically screening the credit report to determine if the credit applicant satisfies the select criteria; and
notifying the credit applicant if the screening determines that the credit report satisfies the select criteria.

8. The credit approval monitoring method of claim 7 wherein periodically screening the credit report to determine if the credit applicant satisfies select criteria of a credit grantor comprises making a daily determination that the credit applicant satisfies the select criteria.

9. A credit approval monitoring method comprising:
providing a notification of adverse action to a credit applicant responsive to the credit applicant not satisfying select criteria;
subsequent to the adverse action notification monitoring a credit report of the credit applicant;
periodically screening the credit report to determine if the credit applicant satisfies the select criteria; and
notifying the credit applicant if the screening determines that the credit report satisfies the select criteria, wherein the notifying the credit applicant if the screening determines that the credit report satisfies the select criteria comprises transmitting an email message to the credit applicant including a link to a network site providing a marketing message to the credit applicant.

10. The credit approval monitoring method of claim 9 further comprising directing the credit applicant to a network site of the credit grantor if the credit applicant responds to the marketing message.

11. The credit approval monitoring method of claim 7 wherein periodically screening the credit report to determine if the credit applicant satisfies select criteria of a credit grantor comprises determining a credit score for the credit applicant and comparing the credit score to the select criteria.

* * * * *